(12) United States Patent
Grauel et al.

(10) Patent No.: US 8,364,542 B2
(45) Date of Patent: Jan. 29, 2013

(54) REUSABLE SLEEVE COVER

(76) Inventors: James Albert Grauel, Redding, CA (US); David Glyn Williams, Redding, CA (US)

( * ) Notice: Subject to any disclaimer, the term of this patent is extended or adjusted under 35 U.S.C. 154(b) by 171 days.

(21) Appl. No.: 12/869,497

(22) Filed: Aug. 26, 2010

(65) Prior Publication Data
US 2011/0178882 A1    Jul. 21, 2011

Related U.S. Application Data

(60) Provisional application No. 61/296,201, filed on Jan. 19, 2010.

(51) Int. Cl.
*G06Q 30/00* (2012.01)
(52) U.S. Cl. ............ 705/15; 705/500; 220/737; 156/52; 373/20; 373/62; 206/459.5
(58) Field of Classification Search ............... 705/15, 705/500; 156/52, 229, 230; 373/20, 62; 220/737; 206/459.5
See application file for complete search history.

(56) References Cited

U.S. PATENT DOCUMENTS

| | | | | |
|---|---|---|---|---|
| 4,467,934 A | * | 8/1984 | Hummer | 220/741 |
| 5,984,156 A | * | 11/1999 | Bridges | 224/566 |
| 6,641,015 B2 | * | 11/2003 | Huggins, Jr. | 224/674 |
| 7,552,841 B2 | * | 6/2009 | Hollis et al. | 220/703 |
| 7,611,031 B2 | * | 11/2009 | Crisp et al. | 222/129 |
| 7,774,231 B2 | * | 8/2010 | Pond et al. | 705/15 |
| 2003/0178337 A1 | * | 9/2003 | Friedman | 206/497 |
| 2005/0021407 A1 | * | 1/2005 | Kargman | 705/15 |
| 2008/0128572 A1 | * | 6/2008 | Epstein | 248/311.2 |
| 2010/0221565 A1 | * | 9/2010 | Skeeter | 428/542.2 |

* cited by examiner

*Primary Examiner* — Vanel Frenel

(57) ABSTRACT

A removable sleeve cover may comprise a frusto-conical body, an insulation liner, and a window pocket frame. The frusto-conical body has an inner surface and an outer surface. The interior surface is configured for receiving a liquid container. The insulated liner may be coupled to the inner surface of the body. The window pocket frame may be attached to the outer surface of the removable sleeve cover.

20 Claims, 4 Drawing Sheets

REUSABLE SLEEVE COVER

CROSS-REFERENCE TO RELATED APPLICATIONS

The present application claims the benefit of U.S. Provisional Application No. 61/296,201 filed on Jan. 19, 2010, the entirety of which is incorporated herein by reference.

BACKGROUND OF THE INVENTION

The present invention relates generally to a sleeve cover to surround a cup containing liquid, and more specifically, to a reusable insulation sleeve cover having a configuration that facilitates easier handling of a liquid container.

Disposable hot beverage cups are customarily used in coffee houses, fast food restaurants, take-out restaurants, concession stands, and the like. These cups are typically manufactured in standard sizes, are conical in shape, and have an open top lip adapted to receive various plastic lids, for example. Paper based coffee cups are often used by the public because they can be recycled and are biodegradable. However, these cups are difficult to handle when they are filled with hot liquid, soup, coffee, or tea. In addition, they can be uncomfortable to handle when they are cold and become slippery due to condensation.

As a result of handling issue, many sellers of such hot beverage provide an additional paper sleeve or a second cup, for example, to a buyer. A second cup, a sleeve, and the like is environmentally unsound, adds additional cost to the product, and results in more waste, etc. More specifically, current existing sleeve covers are disposable and made from card board, cloth, or neoprene. They do not have the structural integrity to support the cup. In addition, the existing sleeves do not have a menu or bar code or a magnetic strip that can be used over again to support the user's favorite drinks.

Therefore, it can be seen that there is a need for a reusable sleeve cover.

SUMMARY OF THE INVENTION

In one aspect, a removable sleeve cover comprises a frusto-conical body having an inner surface and an outer surface; an insulation liner coupled to the inner surface of the body; and a window pocket frame attached to the outer surface of the removable sleeve cover.

In another aspect, a removable sleeve cover comprises a frusto-conical body having an inner surface and an outer surface; an air pocket between the inner surface and the outer surface; and a window pocket frame attached to the outer surface of the removable sleeve cover.

In a further aspect, a method for ordering a beverage comprises purchasing a removable cup sleeve holder having an attachable menu card; completing the menu card to indicate the beverage desired to be ordered; and delivering the sleeve holder containing the completed menu card to beverage order filler.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments. The description is not to be taken in a limiting sense, but is made merely for the purpose of illustrating the general principles, since the scope of the embodiments is best defined by the appended claims.

Various inventive features are described below that can each be used independently of one another or in combination with other features.

Broadly, exemplary embodiments provide a reusable beverage cup sleeve cover. More specifically, exemplary embodiments enable a consumer to hold a hot or cold beverage cup comfortably with a reusable beverage cup sleeve. One exemplary embodiment of the present invention may be a plastic sleeve that can protect the cup from collapsing and an insulated liner that can keep the drink warm for a long period of time. The plastic sleeve may also prevent a cold drink from sweating.

Figure 1:
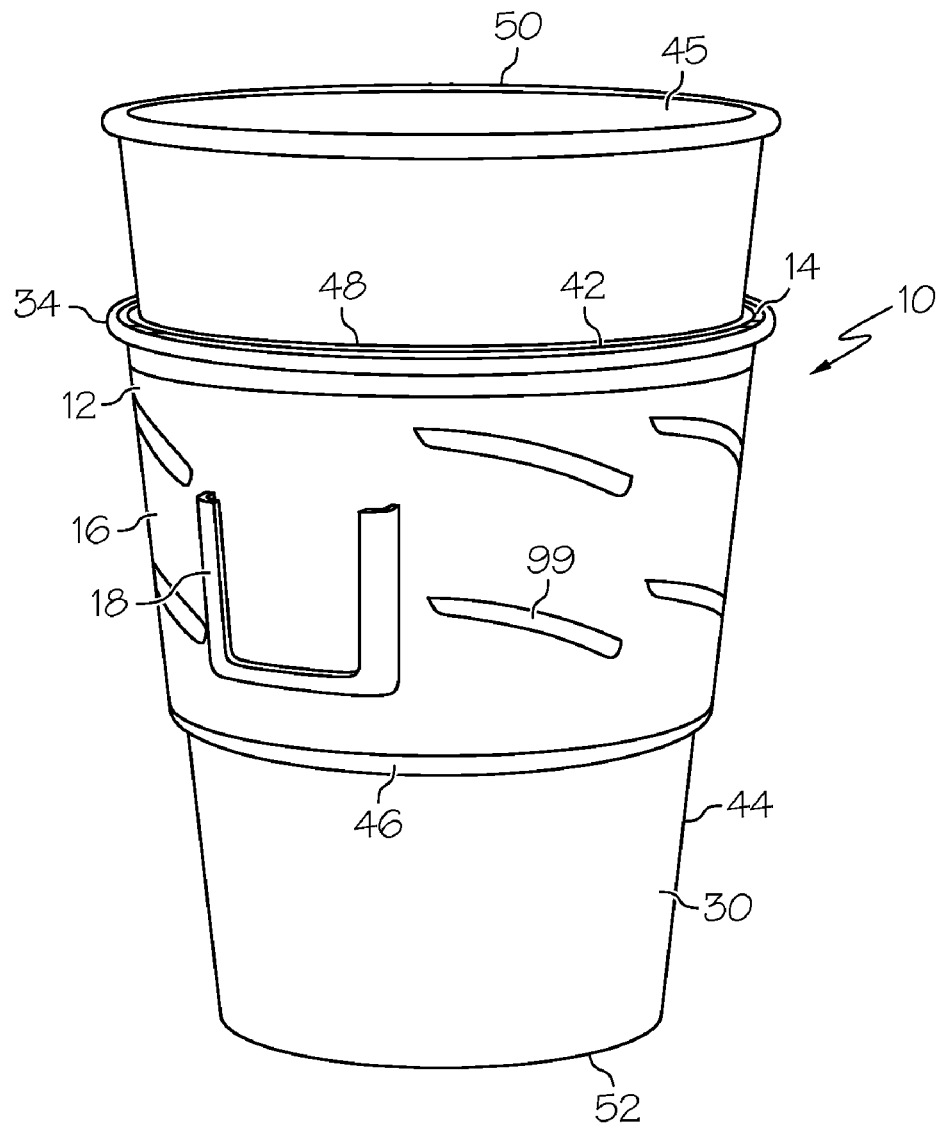
FIG. 1 is a perspective view of an exemplary embodiment of a sleeve cover in use.

FIG. 1 illustrates a perspective view of an exemplary embodiment of a sleeve cover 10 with a cup 30 inserted therein. The cup 30 may be made of paper, paperboard, and the like, and may have a top portion 50 and a bottom portion 52. The top portion 50 may have a larger diameter than the bottom portion 52. The cup 30 may further include an outer surface 44 and an inner surface 45. The inner surface 45 of the cup 30 may be configured to hold beverages.

Still in FIG. 1, the removable sleeve cover 10 of an embodiment of the present invention may comprise an injected molded body 12 forming an outer surface 16. The molded body 12 may be made from, for example, plastic, recycled plastic, aluminum, or stainless steel. The body 12 may also include one extending annular lip 34. The annular lip 34 may be disposed on the top and integrally attached to the outer surface 16 of the removable sleeve cover 10. An insulation liner 14 may be connected to the inner surface 42 of the body 12 and may also be molded with the body 12. A window pocket frame 18, disposed to hold a removable menu card 22 (see FIG. 5), may also be molded with the body 12. A transparent/clear window screen (not shown) may be inserted into the window pocket frame 18 to cover the menu card 22. The clear window screen may protect the menu card 22 from getting dirty. A customer's regular choice of drink may be described and/or encoded on the menu card 22.

FIG. 1 also shows the sleeve cover 10 having a wider open top 48 and a smaller diameter bottom 46. The sleeve cover 10 may have an inner surface 42 adjacent to the cup outer surface 44. The sleeve cover 10 may be slid over the bottom portion 52 of the cup 30 and slid upwardly toward the top portion 50 of the cup 30 until the sleeve cover 10 inner surface 42 fully or partially engages the cup 30. The inner surface 42 may have surface features comprising at least one of the following: a smooth surface, a textured surface, vertical ribs, diagonal ribs, and distributed raised surfaces. In addition, the outer surface 16 may have surface features comprising at least one of the following: a smooth surface, a textured surface, vertical ribs, diagonal ribs, horizontal rib finger grips 99, and distributed raised surfaces.

Still in FIG. 1, the horizontal rib finger grips 99, which may add additional grip to the outer surface 16, may be made from various materials, such as plastics, silicone rubber, for example. The removable sleeve cover 10 may be made from a material that may be reusable, microwave safe, and dishwasher safe and cleanable.

Figure 2:
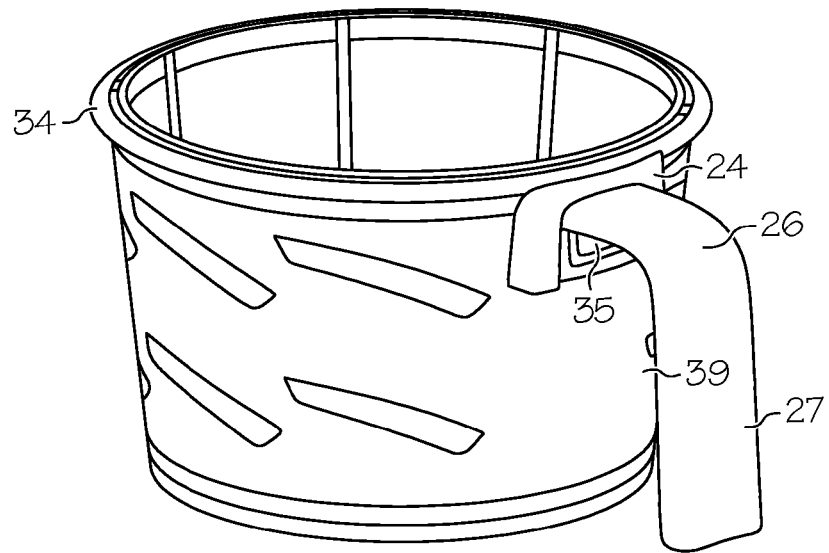
FIG. 2 is a perspective view of the exemplary embodiment of the sleeve cover of FIG. 1 illustrating a mug handle.

FIG. 2 shows a perspective view of the sleeve cover 10 with a mug handle 26 secured to the mounting receptacle 24 (also known as a female connector 24). The gripping handle 26 may comprise an elongated portion 27, and a male connector 35. The gripping handle 26 may define a hand opening 39 through which a user may grip the handle 26 and thereby the sleeve cover 10 which may hold the cup 30.

Figure 3:
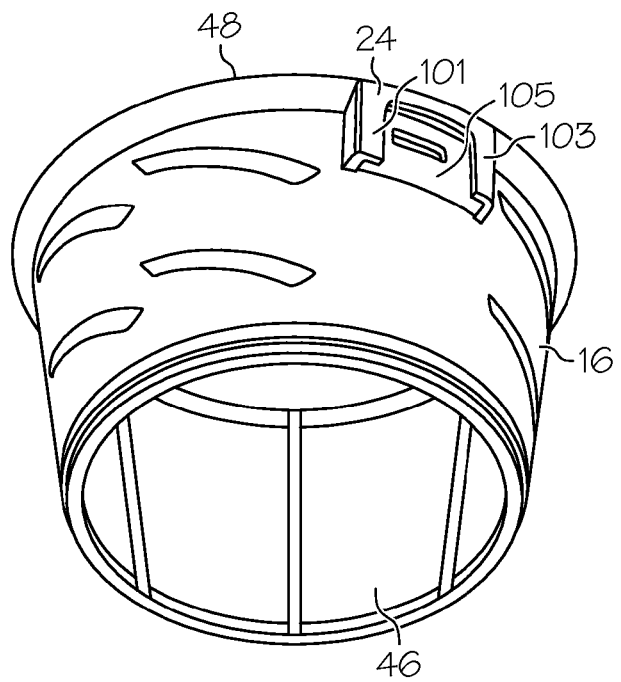
FIG. 3 is a perspective view of the exemplary embodiment of the sleeve cover shown in FIG. 1 illustrating a mounting receptacle.

FIG. 3 shows a perspective view of the exemplary embodiment of the sleeve cover 10 without a cup. The mounting receptacle 24 may further include an open area 105, two slots 101 and 103. The mounting receptacle 24 may be in different shapes other than rectangular and may have a locking mechanism inside the mounting receptacle 24 so that the male connector 35 of the handle 26 may be attached securely to the mounting receptacle 24.

In operation, the male connector 35 may be slid into the slots 101 and 103 toward the open top 48. When the male connector 35 and the female connector 24 are fully engaged with each other, the sleeve handle 26 may turn the sleeve cover 10 into a mug style beverage holder. In one exemplary embodiment of the present invention, the open top 48 may have a larger diameter than the open bottom 46. In another exemplary embodiment, the open top 48 may have substantially the same diameter as the open bottom 46 so that the sleeve cover 10 may be used to hold a bottle or a can. In this embodiment, the bottom 46 may be closed to prevent the bottle or can from sliding through.

Still in FIG. 3, the outer surface 16 of the sleeve cover 10 may be personalized by printed matter. Such printed matter may be pad printed, molded, screen printed, embossed, a tape application, a sticker application, a label, lithography, micro contact printing, pressure sensitive label printing, and the like. The printed matter may comprise decorative insignia, a personal name, a logo, team information, store information, a coffee shop name, company information, a photo, and a picture. The cup sleeve 10 may protect a consumer from both hot or cold liquids, beverages, soups, and the like. The cup sleeve cover 10 may further provide insulative properties, keeping cold fluids cold and hot fluids hot, for example, as well as providing a non-slip type surface for the user to hold. The sleeve cover 10 may be cast molded, compression molded, injection molded, blow molded, extruded, rotational cast, and the like.

Figure 4:
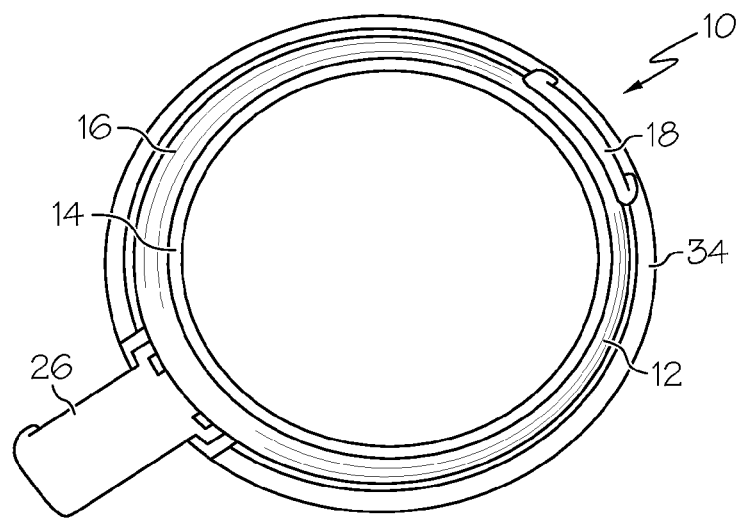
FIG. 4 is a top view of the exemplary embodiment of the sleeve cover shown in FIG. 1.

FIG. 4 shows a top view of the sleeve cover 10. The window pocket frame 18 may be disposed at least up to the top of an outwardly extending annular lip 34. In addition, the handle 26 may be disposed on an opposite side of the sleeve cover 10, across from the window frame 18, so that a consumer's hand may not block the view of menu card 22 inside the window pocket frame 18 when a consumer holds the handle 26.

Still in FIG. 4, the inner liner 14 and the outer surface 16 may be in immediate contact with one another. Alternatively, extra insulation material may be inserted between the inner surface insulation liner 14 and the outer surface 16 to increase the insulation properties of the sleeve cover 10. In a further exemplary embodiment, an air pocket may be disposed between the inner surface 14 and the outer surface 16 to further increase the insulation properties of the sleeve cover 10.

Figure 5:
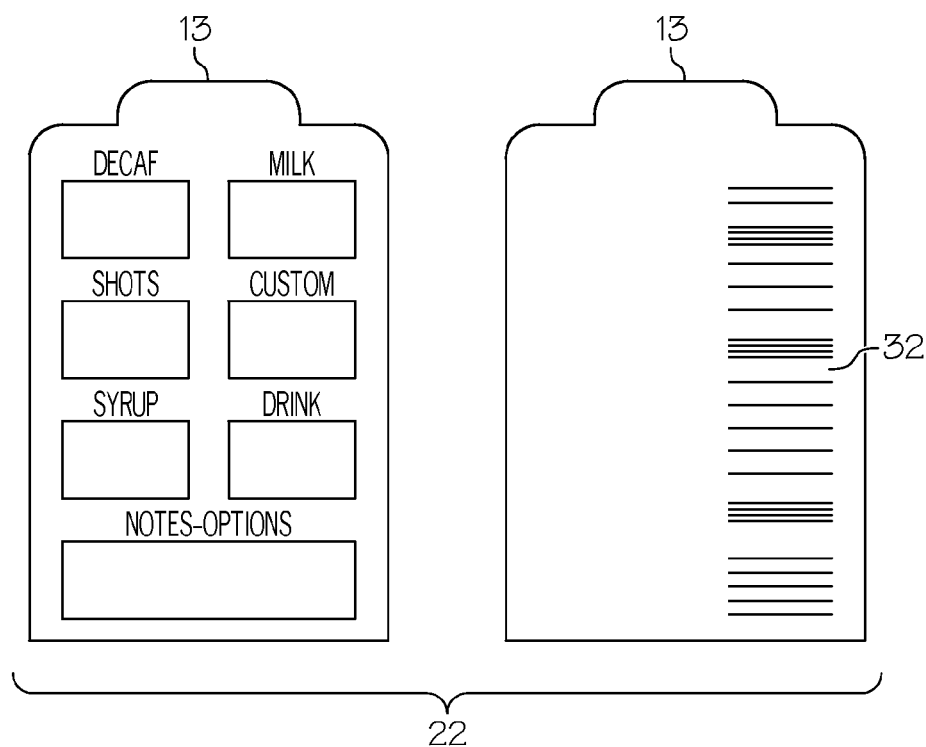
FIG. 5 is a front view of a menu card with a bar code on it.

FIG. 5 shows a front view of the menu card 22 with a bar code 32 on it. The menu card 22 may have different options for a customer to choose, for example, decaf, milk, shots, custom, syrup, drink, and notes-options. The customers may check the item they prefer. The menu card 22 may include the bar code 32 for the specific item which the customers choose. The bar code may expedite and provide accuracy of the order. Furthermore, the bar code 32 may be a check out bar code, which may have ability to link to a user's account to cover the cost of a beverage. The card may have a magnetic strip to allow the customer to load money and pay for their beverage.

Still in FIG. 5, a computer connected scanner may be able to scan and read the bar code 32 at a drive-up facility or for in-store use. The bar code 32 may also be switched out for another preference if so desired. The menu card 22 may be a dry-erase style, or a check the box style provided by the vendor, or a hand-written order card, or a bar coded order card, etc. In one exemplary embodiment, the bar code 32 may be on the front face as the menu options. Alternatively, the bar code 32 may be on the back of the menu card 22. The menu card 22 may include a grab tab 13 at one side thereof. The grab tab 13 may assist a user to insert and remove the menu card 22 from the window pocket frame 18.

Figure 6:
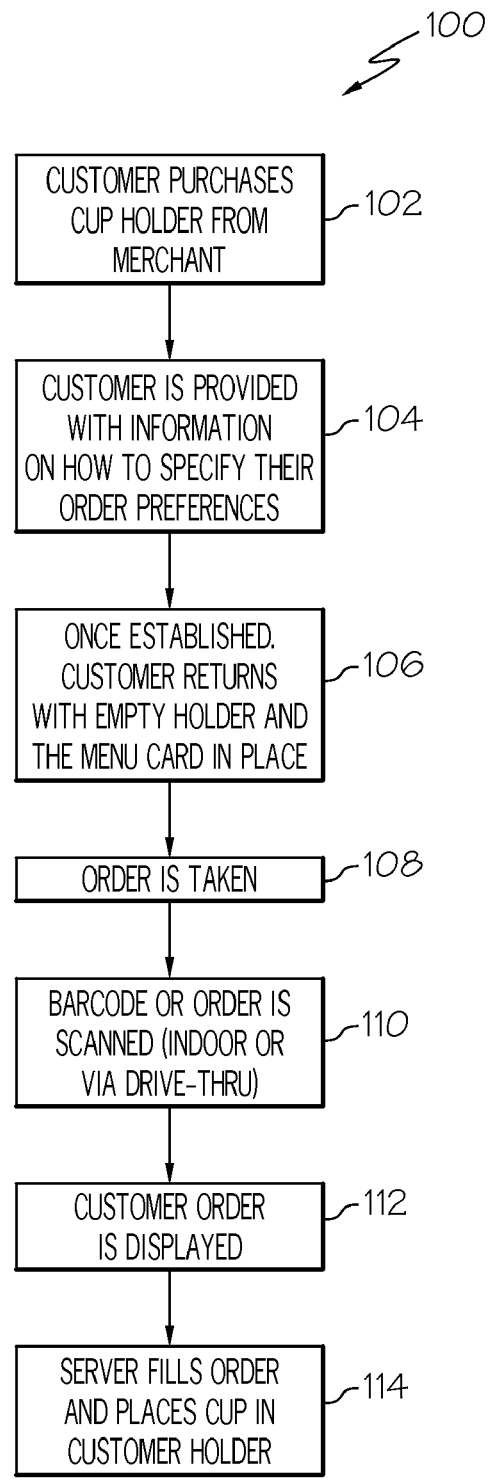
FIG. 6 is a process flow chart of an exemplary embodiment of the present invention.

FIG. 6 shows a process flow diagram 100 illustrating a method of ordering process when a person places an order for a beverage. In step 102, a customer may purchase a cup holder from a merchant, such as a coffee shop. In step 104, customers may be provided with information on how to specify their order preferences by using an insert menu with the bar code on it. Customers may place their order and have the order taker fill in the drink description on the menu inserts. In step 106, once the menus are filled with a customer's order information, the customer may simply hand the sleeve cover to the order taker and tell him or her what size beverage is preferred. In step 108, the order taker can hand the sleeve cover 10 to the coffee maker who can make the drink accordingly. In step 110, if the coffee shop has a computer which allows the scanning of bar codes into the computer, the customer can scan the bar code indoor or via a drive through which may pull up all the drinks of choice. In step 112, the customer order may be displayed and the customer may confirm the drink of choice from the displayed order. In step 114, the server may fill the order and place the filled cup in the customer's sleeve holder. The present method can speed up the customer's ordering process with accuracy, expediency, and privacy.

It should be understood, of course, that the foregoing relate to exemplary embodiments of the invention and that modifications may be made without departing from the spirit and scope of the invention as set forth in the following claims.

We claim:

1. A removable sleeve cover, comprising:
   a frusto-conical body having an inner surface and an outer surface;
   an insulated liner coupled to the inner surface of the body;
   diagonal ribs coupled to the outer surface of the removable sleeve cover; and
   a window pocket frame attached to the outer surface of the removable sleeve cover.

2. The removable sleeve cover of claim 1, further comprising an outwardly extending annular lip attached to the outer surface of the removable sleeve cover.

3. The removable sleeve cover of claim 1, further comprising a removable handle disposed to attach to the outer surface of the body.

4. The removable sleeve cover of claim 3, wherein the removable handle is attached to an outwardly extending annular lip.

5. The removable sleeve cover of claim 1, wherein the outer surface is configured to display printed matter.

6. The removable sleeve cover of claim 5, wherein the printed matter comprises at least one of a decorative insignia, a personal name, a logo, team information, store information, a coffee shop name, company information, a photo, and a picture.

7. A removable sleeve cover, comprising:
 a frusto-conical body having an inner surface and an outer surface;
 an air pocket between the inner surface and the outer surface;
 horizontal rib finger grips; and
 a window pocket frame attached to the outer surface of the removable sleeve cover.

8. The removable sleeve cover of claim 7, further comprising a removable menu card insertable into the window pocket frame.

9. The removable sleeve cover of claim 8, further comprising a bar code disposed on the removable menu card.

10. The removable sleeve cover of claim 9, wherein the bar code is linked to a user's account to be able to cover the cost of a beverage.

11. The removable sleeve cover of claim 7, wherein the inner surface has surface features comprising at least one of the following: a smooth surface, a textured surface, vertical ribs, diagonal ribs, and distributed raised surfaces.

12. The removable sleeve cover of claim 7, wherein the outer surface has surface features comprising at least one of the following: a smooth surface, a textured surface, vertical ribs, diagonal ribs, and distributed raised surfaces.

13. The removable sleeve cover of claim 7, wherein the removable sleeve is made of a material that is reusable.

14. The removable sleeve cover of claim 7, wherein the removable sleeve is made of a material that is dishwasher safe.

15. The removable sleeve cover of claim 1, wherein the removable sleeve is made of a material that is microwave safe.

16. The removable sleeve cover of claim 1, wherein the removable sleeve is made in one piece.

17. A method for ordering a beverage, comprising:
 processing an order for a removable cup sleeve holder using a computer wherein the removable cup sleeve holder has an attachable menu card and diagonal ribs coupled to the outer surface of the removable cup sleeve cover;
 modifying the menu card to indicate the beverage desired to be ordered; and
 delivering the sleeve holder containing the completed menu card to beverage order filler.

18. The method of claim 17, further comprising displaying the order to a customer before the order is filled.

19. The method of claim 18, further comprising confirming the ordered beverage on the displayed order.

20. The method of claim 17, further comprising scanning a bar code on the menu card.

\* \* \* \* \*